US012494039B2

United States Patent
Kato et al.

(10) Patent No.: US 12,494,039 B2
(45) Date of Patent: Dec. 9, 2025

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Masami Kato, Kanagawa (JP); Tsewei Chen, Tokyo (JP); Shiori Wakino, Osaka (JP); Motoki Yoshinaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 18/192,201

(22) Filed: Mar. 29, 2023

(65) Prior Publication Data

US 2023/0334820 A1    Oct. 19, 2023

(30) Foreign Application Priority Data

Apr. 13, 2022   (JP) .................... 2022-066493

(51) Int. Cl.
G06V 10/00  (2022.01)
G06V 10/75  (2022.01)
G06V 10/82  (2022.01)

(52) U.S. Cl.
CPC ............ *G06V 10/751* (2022.01); *G06V 10/82* (2022.01)

(58) Field of Classification Search
CPC ...... G06V 10/751; G06V 10/82; G06V 10/25; G06V 10/24; H04N 23/611; G06N 3/0464;

(Continued)

(56) References Cited

U.S. PATENT DOCUMENTS 7,432,985 B2   10/2008  Ishikawa
7,937,346 B2    5/2011  Kato
(Continued)

FOREIGN PATENT DOCUMENTS

JP       5184824 B2     4/2013
JP    2019-074967 A     5/2019

OTHER PUBLICATIONS

Bertinetto et al Fully-Convolutional Siamese Networks for Object Tracking, arXiv:1606.09549v3 Dec. 1 (Year: 2021).*

(Continued)

*Primary Examiner* — Xiao Liu
(74) *Attorney, Agent, or Firm* — Venable LLP

(57) ABSTRACT

An apparatus sets coefficients in a first array based on first information indicating an image capturing orientation of a first image, generates a first map by applying the coefficients to the first image, acquires a template feature corresponding to an object based on the first map, registers the template feature in an array based on the first information, sets coefficients in a second array based on second information indicating an image capturing orientation of a second image, generates a second map by applying the coefficients set in the second array to the second image, sets the template feature in a feature array based on the second information, performs a correlation calculation between the template feature set in the feature array and the second map, and detects the object from the second image based on a result of the correlation calculation.

14 Claims, 10 Drawing Sheets

(58) Field of Classification Search
CPC ........... G06T 7/248; G06T 2207/20084; G06T 2207/30244
See application file for complete search history.

(56) References Cited

U.S. PATENT DOCUMENTS

| | | | |
|---|---|---|---|
| 8,320,696 | B2 | 11/2012 | Yamamoto |
| 10,861,123 | B2 | 12/2020 | Chen |
| 2010/0223219 | A1 | 9/2010 | Kato |
| 2019/0114734 | A1* | 4/2019 | Chen ...................... G06F 9/545 |
| 2020/0082062 | A1* | 3/2020 | Mequanint .............. G06F 21/44 |
| 2020/0372332 | A1 | 11/2020 | Kimura |

OTHER PUBLICATIONS

Mercier et al., Deep Template-based Object Instance Detection, arXiv 1911.11822v3 Nov. 15 (Year: 2020).*

Yann LeCun, et al., "Convolutional Networks and Applications in Vision," Proc. International Symposium on Circuits and Systems (ISCAS '10), IEEE, 2010, pp. 253-256.

Luca Bertinetto, et al., "Fully-Convolutional Siamese Networks for Object Tracking," ECCV 2016 Workshops, Dec. 1, 2021, pp. 1-16.

* cited by examiner

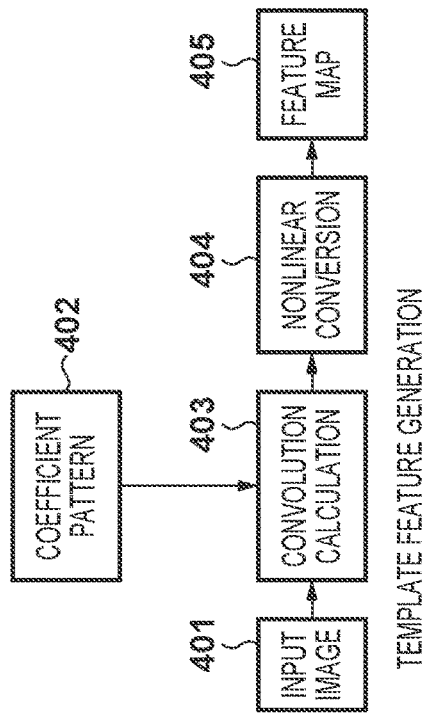
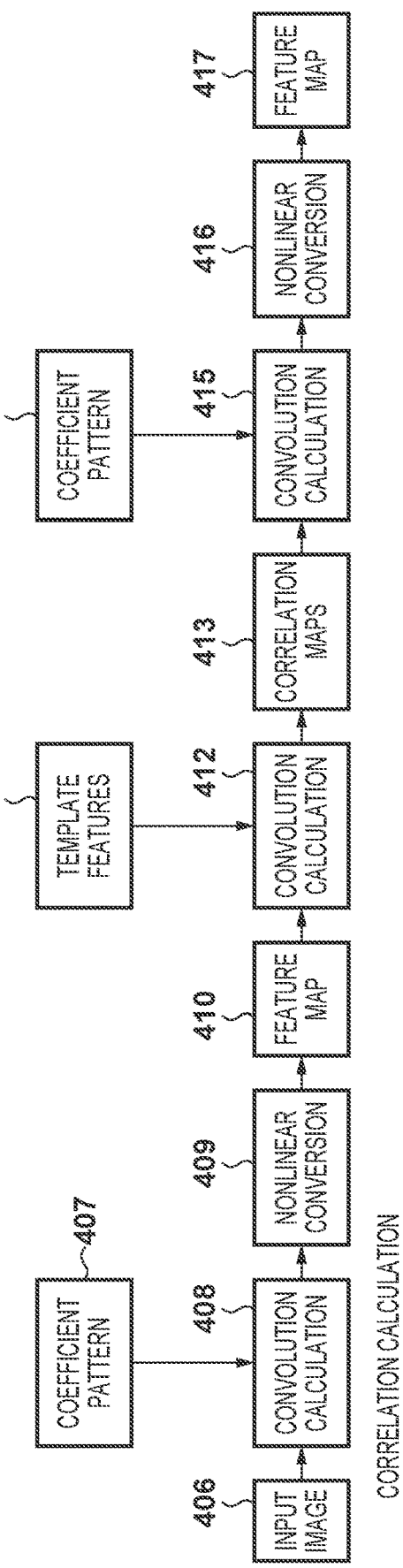

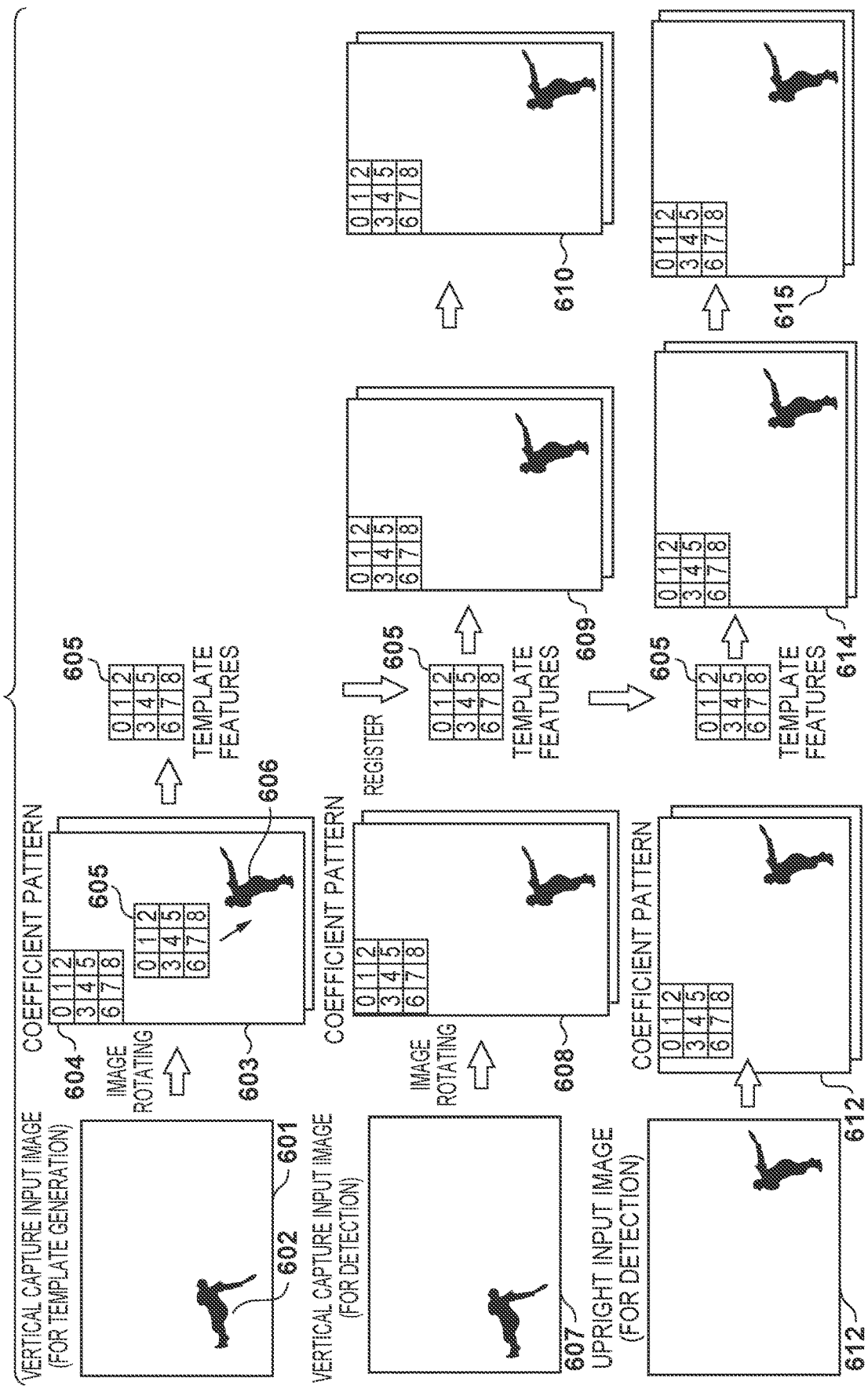

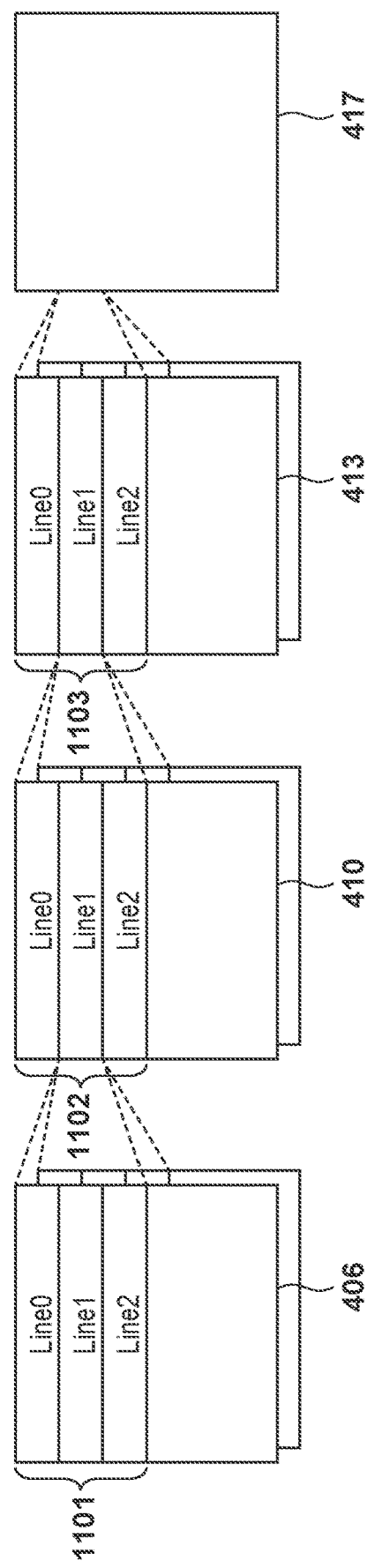

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing technique.

Description of the Related Art

Hierarchical calculation methods (pattern recognition methods based on deep learning techniques) such as convolutional neural networks (hereinafter abbreviated as CNN) have attracted attention as pattern recognition methods that are robust against variations in recognition targets. For example, various applications and implementations are disclosed in Yann LeCun, Koray Kavukcuoglu and Clement Farabet: Convolutional Networks and Applications in Vision, Proc. International Symposium on Circuits and Systems (ISCAS'10), IEEE, 2010.

Object tracking processing methods using cross-correlation between feature amounts calculated by a CNN have been proposed as an application of a CNN (Luca Bertinetto, Jack Valmadre, Joao F. Henriques, Andrea Vedaldi, Philip H. S. Torr: Fully-Convolutional Siamese Networks for Object Tracking, ECCV 2016 Workshops, etc.). Also, a dedicated processing apparatus for processing a CNN requiring a high computational cost at a high speed has been proposed (Japanese Patent Laid-Open No. 2019-74967, etc.).

In the tracking processing method disclosed in Luca Bertinetto, Jack Valmadre, Joao F. Henriques, Andrea Vedaldi, Philip H. S. Torr: Fully-Convolutional Siamese Networks for Object Tracking, ECCV 2016 Workshops, a highly accurate cross-correlation value between CNN feature amounts is calculated by executing convolution calculation processing by providing a CNN feature amount of a target object instead of CNN coefficients. This method can be applied to applications such as tracking a specific object in a moving image by using local cross-correlation values between different frames in an image.

On the other hand, there are cases where the direction of the target object within the angle of view is greatly changed in response to the orientation (upright capturing, vertical capturing, and upside-down capturing) of the image capturing apparatus in the tracking processing. In such cases, the tracking processing can be continued regardless of the orientation of the image capturing apparatus by processing the input image after rotating it in accordance with the orientation of the image capturing apparatus.

However, the processing time increases, a large buffer memory for processing becomes necessary, and the like when rotation processing of the input image is executed by the apparatus; thus, an increase in processing costs becomes a problem in low-cost systems.

SUMMARY OF THE INVENTION

In the present invention, there is provided a technique for enabling a correlation calculation capable of efficiently handling variations in an image capturing orientation.

According to the first aspect of the present invention, there is provided an image processing apparatus, comprising: a first generation unit configured to set filter coefficients in a first coefficient array based on first orientation information indicating an image capturing orientation of a first captured image and generate a first feature map by applying the filter coefficients set in the first coefficient array to the first captured image; a registration unit configured to acquire, based on the first feature map, a template feature corresponding to a target object and register the template feature in a first feature array based on the first orientation information; a second generation unit configured to set filter coefficients in a second coefficient array based on second orientation information indicating an image capturing orientation of a second captured image and generate a second feature map by applying the filter coefficients set in the second coefficient array to the second captured image; a calculation unit configured to set the registered template feature in a second feature array based on the second orientation information and perform a correlation calculation between the template feature set in the second feature array and the second feature map; and a detection unit configured to detect, based on a result of the correlation calculation, the target object from the second captured image.

According to the second aspect of the present invention, there is provided an image processing method performed by an image processing apparatus, the method comprising: setting filter coefficients in a first coefficient array based on first orientation information indicating an image capturing orientation of a first captured image and generating a first feature map by applying the filter coefficients set in the first coefficient array to the first captured image; acquiring, based on the first feature map, a template feature corresponding to a target object and registering the template feature in a first feature array based on the first orientation information; setting filter coefficients in a second coefficient array based on second orientation information indicating an image capturing orientation of a second captured image and generating a second feature map by applying the filter coefficients set in the second coefficient array to the second captured image; setting the registered template feature in a second feature array based on the second orientation information and performing a correlation calculation between the template feature set in the second feature array and the second feature map; and detecting, based on a result of the correlation calculation, the target object from the second captured image.

According to the third aspect of the present invention, there is provided a non-transitory computer-readable storage medium that stores a computer program to cause a computer to function as, a first generation unit configured to set filter coefficients in a first coefficient array based on first orientation information indicating an image capturing orientation of a first captured image and generate a first feature map by applying the filter coefficients set in the first coefficient array to the first captured image; a registration unit configured to acquire, based on the first feature map, a template feature corresponding to a target object and register the template feature in a first feature array based on the first orientation information; a second generation unit configured to set filter coefficients in a second coefficient array based on second orientation information indicating an image capturing orientation of a second captured image and generate a second feature map by applying the filter coefficients set in the second coefficient array to the second captured image; a calculation unit configured to set the registered template feature in a second feature array based on the second orientation information and perform a correlation calculation between the template feature set in the second feature array and the second feature map; and a detection unit configured to detect, based on a result of the correlation calculation, the target object from the second captured image.

Further features of the present invention will become apparent from the following description of exemplary embodiments with reference to the attached drawings.

BRIEF DESCRIPTION OF THE DRAWINGS

FIGS. 4A and 4B are views illustrating operations of a CNN processed by the calculation processing unit 102 and a conversion processing unit 105.

FIG. 6 is a view illustrating conventional template feature extraction and correlation calculation in a case where an image capturing orientation changes.

FIG. 11 is a view for schematically describing an example of a feature surface of a CNN in a case where processing is performed by using a line buffer.

DESCRIPTION OF THE EMBODIMENTS

Figure 1:
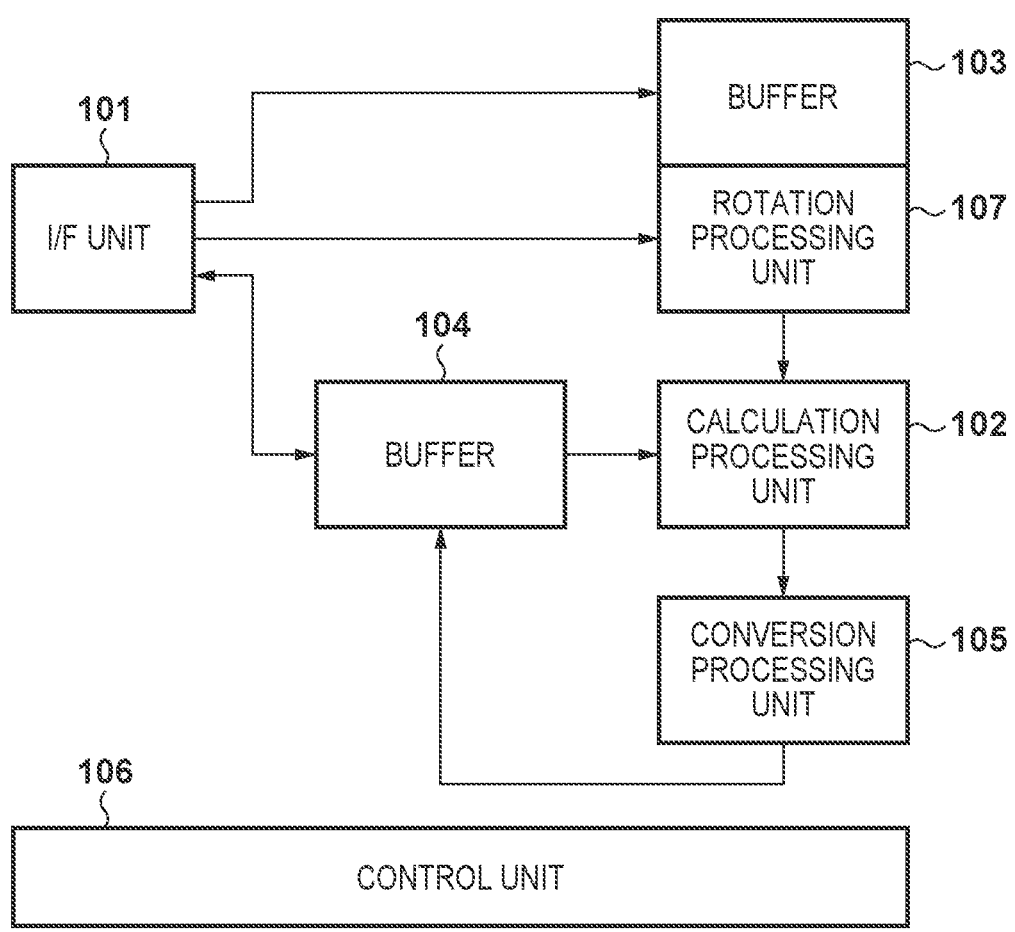
FIG. 1 is a block diagram illustrating an example of a hardware configuration of a correlation calculation unit 201.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

The image processing apparatus according to the present embodiment generates a first feature map by applying filter coefficients that are set in a first array based on first orientation information indicating an image capturing orientation of a first captured image to the first captured image, acquires a template feature corresponding to a target object based on the first feature map, and registers the template feature in an array based on the first orientation information. Also, the image processing apparatus: generates a second feature map by applying filter coefficients that are set in a second array based on second orientation information indicating an image capturing orientation of a second captured image to the second captured image; performs a correlation calculation between the second feature map and the registered template feature, the template feature being set in an array based on the second orientation information; and detects, based on a result of the correlation calculation, the target object from the second captured image. Hereinafter, one example of such an image processing apparatus will be described.

Figure 2:
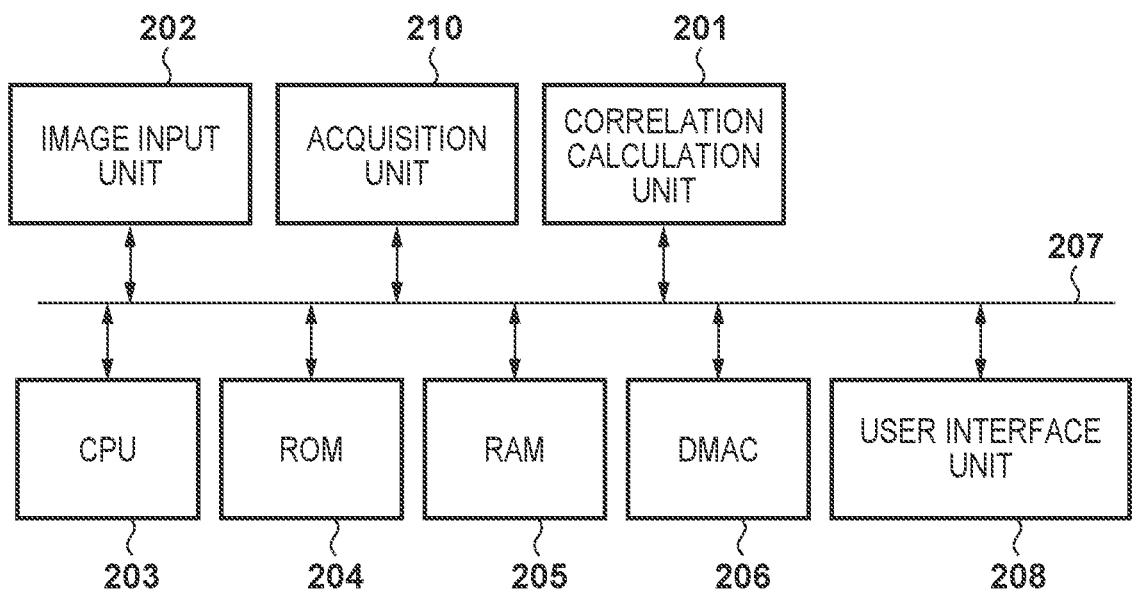
FIG. 2 is a block diagram illustrating an exemplary hardware configuration of an image processing apparatus.

First, a hardware configuration example of the image processing apparatus according to the present embodiment will be described with reference to the block diagram of FIG. 2. A device such as an image capturing apparatus capable of capturing a still image or a moving image, a smartphone, and a tablet terminal apparatus or a personal computer on which the image capturing apparatus is mounted can be applied to the image processing apparatus according to the present embodiment.

An image input unit 202 is an image capturing unit that includes a photoelectric conversion device such as an optical system, a Charge-Coupled Device (CCD), or a Complimentary Metal Oxide Semiconductor (CMOS) sensor, a driver circuit for controlling the operation of the optical system or the photoelectric conversion device, an A/D converter, an image processing circuit, and the like. Light from the outside world passes through the optical system and enters the photoelectric conversion device, the photoelectric conversion device outputs an analog image signal in accordance with the light that entered, and the analog image signal is converted into a digital image signal by an A/D converter. The digital image signal is converted into a captured image through processing such as demosaicing or color processing in the image processing circuit. That is, the image input unit 202 acquires a captured image as an input image.

An acquisition unit 210 includes an orientation sensor that measures its orientation as the orientation of the image processing apparatus, and the acquisition unit 210 acquires and outputs orientation information indicating the orientation measured by the orientation sensor. In the present embodiment, as one example, the acquisition unit 210 acquires and outputs orientation information indicating which direction of four directions orthogonal to the optical axis of the image capturing unit the orientation measured by the orientation sensor corresponds to. That is, the acquisition unit 210 acquires information regarding the direction (upright, held vertically, or held upside down) of the image capturing unit with respect to the target object. In other words, the direction of the image capturing unit corresponds to the direction in which the user is holding the image processing apparatus, and corresponds to any one of upright capturing, vertical capturing, and upside down capturing.

The correlation calculation unit 201 performs various types of processing such as registration processing for acquiring and registering a template feature based on the input image acquired by the image input unit 202, and correlation calculation processing based on the input image acquired by the image input unit 202 and a registered template feature.

A Central Processing Unit (CPU) 203 executes various processing using computer programs and data stored in a Read Only Memory (ROM) 204 or a Random Access Memory (RAM) 205. By this, the CPU 203 controls the operation of the entire image processing apparatus and executes or controls various processing which is described as being performed by the image processing apparatus.

The ROM 204 stores setting data of the image processing apparatus, computer programs or data related to activation of the image processing apparatus, computer programs or data related to basic operation of the image processing apparatus, and the like. The ROM 204 also stores computer programs or data for causing the CPU 203 to execute or control various processing which is described as being performed by the image processing apparatus.

The RAM 205 includes an area for storing an input image inputted from the image input unit 202, an area for storing orientation information acquired by the acquisition unit 210, and an area for storing data outputted from the correlation calculation unit 201. The RAM 205 further includes an area for storing computer programs or data loaded from the ROM 204, and a work area used when the CPU 203 executes various processing. As described above, the RAM 205 can provide various areas as appropriate. The RAM 205 is configured by, for example, a large-capacity Dynamic Random Access Memory (DRAM) or the like.

A Direct Memory Access Controller (DMAC) 206 controls data transfer between the image input unit 202 or the RAM 205 and the correlation calculation unit 201.

A user interface unit 208 has a user interface such as a button, a switch, and a touch panel, and various instructions (for example, an instruction for tracking a target) can be inputted to the CPU 203 by user operations. Further, the user interface unit 208 includes a display screen (a liquid crystal screen, a touch panel screen, or the like) for displaying a processing result (for example, a result of tracking processing) by the apparatus.

The image input unit 202, the acquisition unit 210, the correlation calculation unit 201, the CPU 203, the ROM 204, the RAM 205, the DMAC 206, and the user interface unit 208 are all connected to a system bus 207.

The correlation calculation unit 201 performs the above-described correlation calculation process in accordance with an instruction from the CPU 203 and generates a detection map indicating a likelihood of a position of an object (to be described here as a tracking target object) in the input image. The detection map is stored in the RAM 205 by the CPU 203. The CPU 203 uses the result of the tracking processing of the tracking target object based on the detection map stored in the RAM 205 to provide various applications. For example, the tracking processing result is fed back to the image input unit 202, and is used for control of the focus of the optical system for tracking the tracking target object and the like. Note, the method of using the detection map generated based on the correlation calculation by the correlation calculation unit 201 is not limited to a specific method. Further, the method is not limited to the specific method described below for using the various maps appearing in the following description.

Next, description is given with reference to the block diagram of FIG. 1 regarding a hardware configuration example of the correlation calculation unit 201. An I/F unit 101 is an interface accessible to the CPU 203 or the DMAC 206 via the system bus 207, and the correlation calculation unit 201 transmits and receives data to and from the outside via the I/F unit 101.

For each layer (each hierarchy) of the CNN, a two-dimensional array (coefficient pattern) of weighting coefficients (CNN coefficients) in the layer are stored in a buffer 103, and the buffer 103 is a buffer (memory apparatus) capable of supplying the coefficient pattern with low delay.

Also, a CNN feature group within a local region in the "two-dimensional array (feature map) of CNN features of a final layer of the CNN" acquired by a conversion processing unit 105 is stored as a template feature in the buffer 103. The CPU 203 reads the "feature map of the final layer of the CNN" that has been acquired by the conversion processing unit 105 and stored in the buffer 104 via the I/F unit 101, and then extracts a CNN feature group within a local region in the read feature map as a template feature. Then, the CPU 203 rotates the extracted template feature in accordance with the orientation information acquired by the acquisition unit 210, and stores the rotated template feature in the buffer 103 via the I/F unit 101.

A buffer 104 is a buffer (memory apparatus) that can store the feature map acquired by the conversion processing unit 105 with low delay. The buffer 103 and the buffer 104 can be implemented by, for example, a high speed memory, a register, or the like. Note, although the buffer 103 and the buffer 104 are each separate buffers in FIG. 1, each may be a separate memory region in a single buffer.

In a case where the coefficient pattern and the orientation information are acquired from the CPU 203 via the I/F unit 101, the rotation processing unit 107 rotates the acquired coefficient pattern in accordance with the acquired orientation information, and then supplies the rotated coefficient pattern to the calculation processing unit 102. For example, in a case where the orientation information indicates "vertically held" (that is, in a case where the input image acquired by the image input unit 202 is vertically captured), the rotation processing unit 107 rotates the coefficient pattern by 90 degrees clockwise, and then supplies the rotated coefficient pattern to the calculation processing unit 102.

On the other hand, in a case where the template feature and the orientation information are acquired from the CPU 203 via the I/F unit 101, the rotation processing unit 107 rotates the acquired the template feature in accordance with the acquired orientation information, and then supplies the rotated template feature to the calculation processing unit 102. For example, in a case where the orientation information indicates "vertically held" (that is, in a case where the input image acquired by the image input unit 202 is vertically captured), the rotation processing unit 107 rotates the template feature by 90 degrees clockwise, and then supplies the rotated template feature to the calculation processing unit 102.

The calculation processing unit 102 performs a convolution calculation, and the conversion processing unit 105 performs a nonlinear conversion on the result of the convolution calculation performed by the calculation processing unit 102. Note that the nonlinear conversion in the conversion processing unit 105 uses a well-known activation process such as Rectified Linear Unit (ReLU) or a sigmoid function. In a case where ReLU is used, processing can be implemented by threshold processing, and in a case where a sigmoid function is used, values are converted by a look-up table or the like. A control unit 106 controls various operations of the correlation calculation unit 201.

Next, an operation (a process for generating a feature map) of the CNN processed by the calculation processing unit 102 and the conversion processing unit 105 will be described with reference to FIG. 4A. In the CNN, a convolution calculation 403 between an input image 401 and a coefficient pattern 402 is performed, and nonlinear conversion 404 is performed on the result of the convolution calculation 403 to generate a feature map 405.

Here, in a case where a kernel (filter-coefficient matrix) size of the convolution calculation is columnSize×rowSize and the number of feature maps of the layers previous to the layer to be processed in the CNN is L, one feature map is calculated based on a convolution calculation as described below.

[EQUATION 1]
$$\text{output}(x, y) = \sum_{l=1}^{L} \sum_{row=-rowSize/2}^{rowSize/2} \sum_{column=-columnSize/2}^{columnSize/2} \text{input}(x + \text{column},$$

$$y + \text{row}) \times \text{weight}(\text{column}, \text{row})$$

input(x,y): Reference pixel value in two-dimensional coordinates (x, y)

output(x,y): Calculation result in two-dimensional coordinates (x, y)

weight(column, row): CNN coefficient at coordinate (x+column, y+row)

L: Number of feature maps in the previous layers columnSize, rowSize: Horizontal and vertical size of two-dimensional convolution kernel Generally, in the calculation processing in the CNN, a product-sum calculation is repeated while a plurality of convolution kernels are scanned in units of pixels of the input image in accordance with the above equation, and a feature map is calculated by performing a nonlinear conversion (activation process) on the final product-sum calculation result. That is, pixel data of one feature map is generated by a plurality of spatial filter calculations and a nonlinear calculation on the sum of the spatial filter calculations. In the present embodiment, a CNN coefficient corresponds to a spatial filter coefficient. Also, in practice, a plurality of feature maps are generated for each layer.

The calculation processing unit 102 includes a multiplier and a cumulative adder, and the multiplier and the cumulative adder execute the convolution calculation represented by the above equation. Then, the conversion processing unit 105 generates a feature map by performing nonlinear conversion on the result of the convolution calculation. In a typical CNN, the above described process is repeated for the number of feature maps to be generated.

Figure 5:
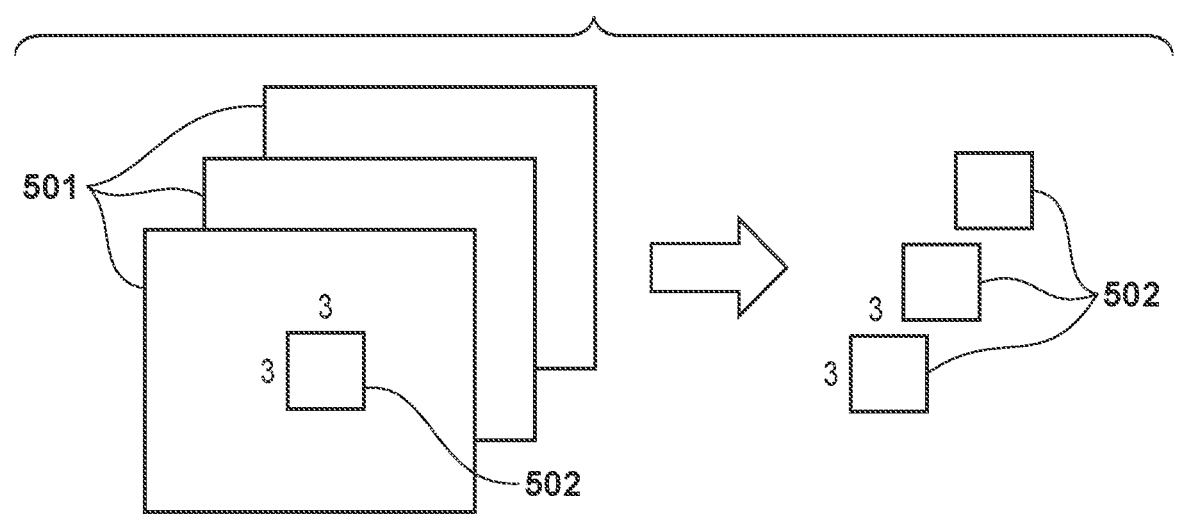
FIG. 5 is a view illustrating an acquisition of template features from a feature map.

Next, acquisition of a template feature from a feature map will be described with reference to FIG. 5. A case where three feature maps 501 are acquired from the final layer of the CNN is illustrated in FIG. 5. Here, the CPU 203 extracts, from each of the three feature maps 501, a feature group (CNN feature group) within a region (a small spatial region) having a size of 3 pixels by 3 pixels as a template feature 502. In this case, the data size of the template feature 502 is 9. The position of the "small spatial region" is a position of a pre-specified target object. For example, in a case of object tracking processing, the template feature is the feature amount of the tracking target object. By using a correlation (correlation map) between the template feature and the feature map, the position of the tracking target object can be known. That is, a position exhibiting a high correlation in the input image can be determined as the position of the tracking target object in the input image.

Next, an operation (various calculation processing including a correlation calculation in which a template feature is used) of the CNN processed by the calculation processing unit 102 and the conversion processing unit 105 will be described with reference to FIG. 4B. In the CNN, a convolution calculation 408 between an input image 406 and a coefficient pattern 407 is performed, and nonlinear conversion 409 is performed on the result of the convolution calculation 408 to generate feature maps 410. Here, the feature maps 410 are assumed to be three feature maps, and the registered template features 411 are assumed to be the three template features 502 in FIG. 5. Next, in the CNN, a correlation between the feature maps 410 and the template features 411 is calculated by performing a convolution calculation 412 between the feature maps 410 (three feature maps) and the template features 411 (three template features 502). By repeating the convolution calculation 412 within the feature maps, three types of correlation maps are calculated as correlation maps 413 from the three feature maps as in the case of FIG. 5. Here, the correlation calculation is the same operation as a so-called depthwise type CNN calculation process in which the coupling of an output map to the input feature map is one-to-one (L=1 in the above equation). The content of the process is a Siamese correlation calculation method described in Luca Bertinetto, Jack Valmadre, Joao F. Henriques, Andrea Vedaldi, Philip H. S. Torr: Fully-Convolutional Siamese Networks for Object Tracking, ECCV 2016 Workshops and the like. Next, in the CNN, a convolution calculation 415 between the correlation maps 413 and a coefficient pattern 414 is performed, and nonlinear conversion 416 is performed on the result of the convolution calculation 415 to generate a feature map (detection map) 417. The feature map 417 is a single feature map. By performing the CNN processing (convolution calculation and nonlinear conversion) on the correlation maps 413, a correlative relationship is clarified, and a detection map that allows more stable detection of a target object can be acquired. A value (element value) of each element in the detection map represents the likelihood (probability) that the element is an element constituting the target object corresponding to the template feature. Therefore, the position at which the element value in the detection map peaks can be determined as the position of the target object corresponding to the template feature.

A map that allows the position of the target object corresponding to the template feature to be detected for each image can be generated by performing the operation shown in FIG. 4B, for example, for each frame included in a moving image or each of a plurality of still images captured periodically or irregularly. In other words, it is possible to generate a map that allows a specific target object to be tracked in a plurality of images.

Next, the operation of the image processing apparatus according to the present embodiment will be described according to the flowchart of FIG. 10. In step S1001, the CPU 203 performs various initialization processing required for the operation of the correlation calculation unit 201.

In step S1002, the CPU 203 reads various operation parameters required for the operation of the correlation calculation unit 201 from the ROM 204 and stores them in the RAM 205. Note, the source of an operation parameter is not limited to the ROM 204.

In step S1003, the CPU 203 determines whether to generate and store a template feature in the buffer 103. For example, in a case where a template feature is to be newly registered in the buffer 103, it is determined that "a template feature is generated and stored in the buffer 103". Also, for example, in a case where a template feature stored in the buffer 103 is updated to a new template feature, it is determined that a template feature is generated and stored in the buffer 103.

As a result of such a determination, the process advances to step S1004 in a case where it is determined that "a template feature is generated and stored in the buffer 103". On the other hand, the process advances to step S1008 in a case where it is not determined that "a template feature is generated and stored in the buffer 103". In step S1004, the CPU 203 acquires orientation information indicating the direction of the image capturing unit acquired by the acquisition unit 210.

In step S1005, the CPU 203 acquires a coefficient pattern stored in the buffer 103 via the I/F unit 101. Then, the CPU 203 controls the DMAC 206 to output the acquired coefficient pattern, the orientation information acquired in step S1004, and the input image acquired by the image input unit 202 (the image captured in the image capturing orientation indicated by the orientation information) to the correlation calculation unit 201. The input image inputted to the correlation calculation unit 201 via the I/F unit 101 is stored in the buffer 104. The rotation processing unit 107 rotates the coefficient pattern acquired from the CPU 203 via the I/F unit 101 in accordance with the orientation information acquired from the CPU 203 via the I/F unit 101. For example, in a case where the orientation information indicates that the image capturing unit is "vertically held" (that is, in a case where the input image acquired by the image input unit 202 is vertically captured), the coefficient pattern is rotated 90 degrees clockwise. The calculation processing unit 102 performs a convolution calculation between the input image stored in the buffer 104 and the coefficient pattern rotated by the rotation processing unit 107. The conversion processing unit 105 generates (a first generation) a feature map by performing nonlinear conversion on the result of the convolution calculation performed by the calculation processing unit 102. The generated feature map is stored in the buffer 104. Subsequently, by "the convolution calculation between the feature map (the feature map corresponding to the previous layer) stored in the buffer 104 and the coefficient pattern rotated by the rotation processing unit 107" being performed by the calculation processing unit 102 and "the processing for generating a feature map by performing nonlinear conversion on a result of the convolution calculation by the calculation processing unit 102 and storing the generated feature map to the buffer 104" being performed by the conversion processing unit 105 for each layer toward the final layer of the CNN, a feature map in each layer of the CNN is stored in buffer 104. Then, the CPU 203 acquires the "feature map in the final layer of the CNN" stored in the buffer 104 via the I/F unit 101. Also, the CNN feature group within the local region corresponding to the target object in the acquired feature map is acquired as a template feature.

In step S1006, the CPU 203 rotates the template feature acquired in step S1005 according to the orientation information acquired in step S1004 (a reverse rotation with respect to the rotation of the coefficient pattern by the rotation processing unit 107 is performed on the template feature). For example, in a case where the orientation information indicates "vertically held" (that is, in a case where the input image acquired by the image input unit 202 is vertically captured), the template feature acquired in step S1005 is rotated 90 degrees counterclockwise. In step S1007, the CPU 203 stores the template feature reversely rotated in step S1006 in the buffer 103 via the I/F unit 101.

In step S1008, the CPU 203 acquires orientation information acquired by the acquisition unit 210. Here, the orientation information acquired in step S1008 is information indicating the orientation of the image capturing unit measured by the orientation sensor at a measurement timing that differs from the measurement timing corresponding to the orientation information acquired in step S1004.

In step S1009, the CPU 203 acquires the coefficient pattern and the template feature stored in the buffer 103 via the I/F unit 101. Then, the CPU 203 controls the DMAC 206 to output the acquired coefficient pattern and the template feature, the orientation information acquired in step S1008, and the input image acquired by the image input unit 202 (the image captured in the image capturing orientation indicated by the orientation information) to the correlation calculation unit 201. The input image inputted to the correlation calculation unit 201 via the I/F unit 101 is stored in the buffer 104. The rotation processing unit 107 rotates the coefficient pattern acquired from the CPU 203 via the I/F unit 101 in accordance with the orientation information acquired from the CPU 203 via the I/F unit 101. The calculation processing unit 102 performs a convolution calculation between the input image stored in the buffer 104 and the coefficient pattern rotated by the rotation processing unit 107. The conversion processing unit 105 performs nonlinear conversion on the result of the convolution calculation performed by the calculation processing unit 102 to generate a feature map (a second generation), and stores the generated feature map in the buffer 104. Subsequently, by "the convolution calculation between the feature map (the feature map corresponding to the previous layer) stored in the buffer 104 and the coefficient pattern rotated by the rotation processing unit 107" being performed by the calculation processing unit 102 and "the processing for generating a feature map by performing nonlinear conversion on a result of the convolution calculation by the calculation processing unit 102 and storing the generated feature map to the buffer 104" being performed by the conversion processing unit 105 for each layer toward the final layer of the CNN, a feature map in each layer of the CNN is stored in buffer 104. Also, the rotation processing unit 107 rotates the template feature acquired from the CPU 203 via the I/F unit 101 in accordance with the orientation information acquired from the CPU 203 via the I/F unit 101. For example, in a case where the orientation information indicates "vertically held" (that is, in a case where the input image acquired by the image input unit 202 is vertically captured), the rotation processing unit 107 rotates the template feature 90 degrees clockwise. Also, by the calculation processing unit 102 performing a convolution calculation between the rotated template feature and the "feature map in the final layer of the CNN" stored in the buffer 104, the calculation processing unit 102 acquires a correlation map indicating a correlation between the feature map and the template feature. Next, a map acquired from the final layer of the CNN is acquired as a detection map by performing, on the correlation map, processing similar to "the hierarchical convolution calculation and the nonlinear conversion performed on the input image by the calculation processing unit 102 and the conversion processing unit 105" described above.

In step S1010, the CPU 203 acquires the detection map acquired by the correlation calculation unit 201 from the correlation calculation unit 201 via the I/F unit 101, and stores the acquired detection map in the RAM 205.

In step S1011, the CPU 203 determines whether or not a termination condition of the process has been satisfied. For example, in a case where the user operates the user interface unit 208 to input an instruction to terminate the process, it is determined that the termination condition of the process is satisfied. Further, for example, in a case where the time elapsed from the start of the process according to the flowchart of FIG. 10 reaches a specified time, or in a case where the number of repetitions of the processing in steps S1003 to S1010 reaches a predetermined number of times, it is determined that the termination condition of the process is satisfied. As described above, the termination condition of the processing is not limited to a specific condition.

Figure 10:
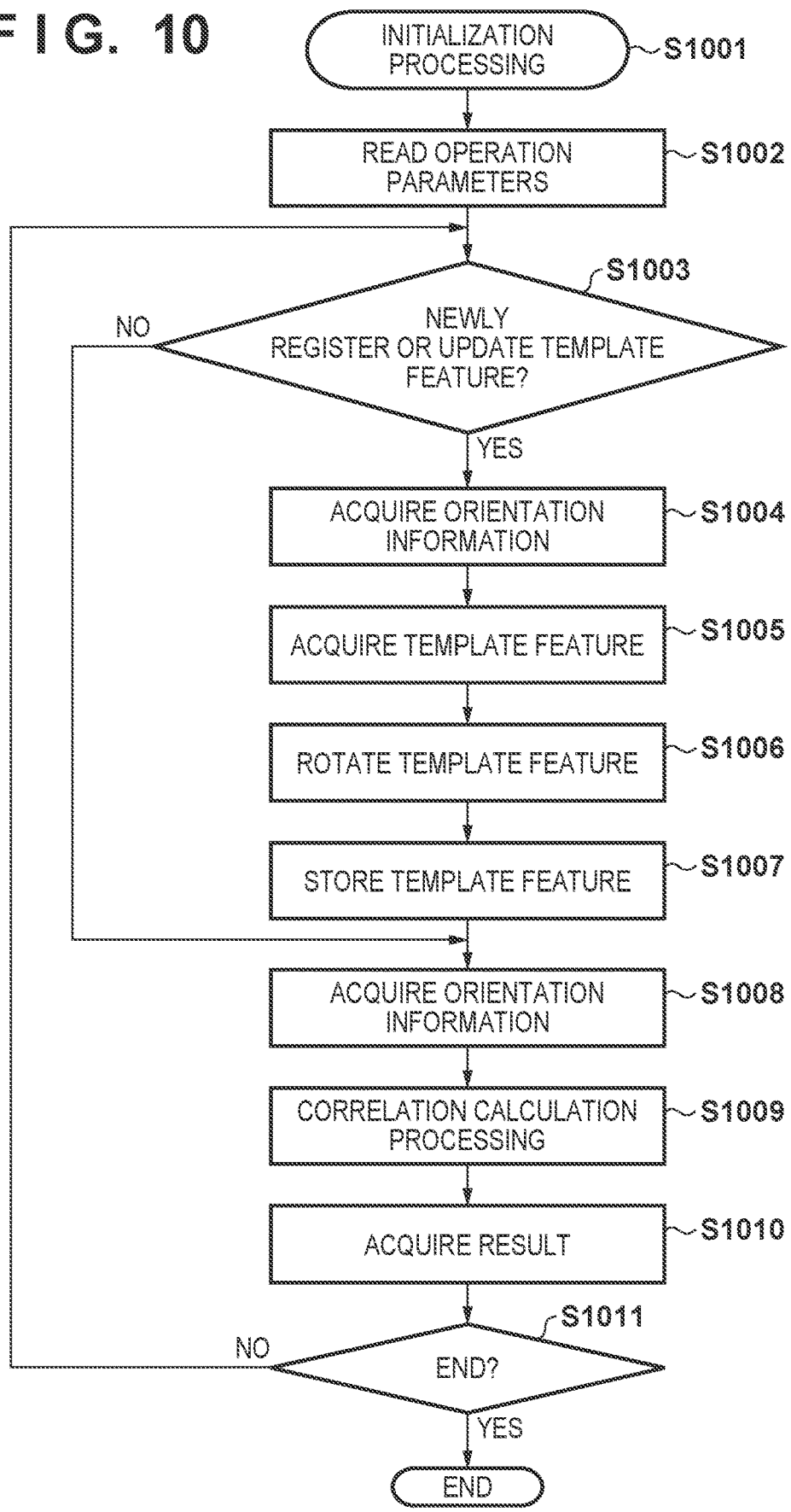
FIG. 10 is a flowchart illustrating an operation of the image processing apparatus.

In a case where the termination condition of the process is satisfied as a result of such determination, the process according to the flowchart of FIG. 10 ends. On the other hand, in a case where the termination condition of the process is not satisfied, the process advances to step S1003.

Next, features of the present embodiment will be described. Firstly, a conventional method of an extraction and correlation calculation of a template feature in a case where an image capturing orientation changes is described with reference to FIG. 6. An input image 601 is a captured image in which a target object 602 has been captured vertically. Hereinafter, a case in which a template feature is generated from the input image 601 and registered will be described. In a case of vertical capturing, the input image outputted by the image input unit 202 is assumed to be a horizontally long raster image (the target object was captured such that it is rotated within the input image).

In this case, first, the input image 601 is rotated in accordance with the image capturing orientation (in this case, vertical capturing), and a feature map is acquired by performing CNN processing, in which a coefficient pattern 604 is used, on a rotated input image 603. It is necessary to rotate the input image 601 in order to extract a feature map similar to that in a case where the image capturing orientation is upright since the coefficient pattern 604 has been acquired by learning an upright target object. Then, a feature of a region at the position of a target object 606 is extracted from the acquired feature map as a template feature 605 (the actual position of the template feature 605 is the position of the target object 606, but it is intentionally shifted for the purpose of description in FIG. 6). In this case, the template feature 605 is registered for the subsequent correlation calculation.

After the template feature 605 is registered, in a case where a new vertically captured input image 607 is inputted, the input image 607 is rotated in accordance with the image capturing orientation of the input image 607, and a feature map is acquired by performing CNN processing, in which a coefficient pattern is used, on a rotated input image 608. Then, a correlation map 609 is generated from the acquired feature map and the previously registered template feature 605, and a detection map 610 is generated from the correlation map 609.

In a case of an input image 612 in which the image capturing orientation is upright with respect to the target object 606, rotation of the image is unnecessary. In this case, the CNN processing is performed on the input image 612 using a coefficient pattern to acquire a feature map, a correlation map 614 is generated from the feature map and the previously registered template feature 605, and a detection map 615 is generated from the correlation map 614.

As described above, conventionally, the input image is rotated and processed in accordance with the image capturing orientation. However, a processing cost increases, such as the processing time necessary for processing for rotating the input image increasing and a size of a buffer memory for processing for rotating the input image increasing, since the number of pixels of an input image is generally large. In general, a frame memory is required for vertical and horizontal image conversion, which is a major problem in an inexpensive image capturing apparatus, for example.

Figure 7A:
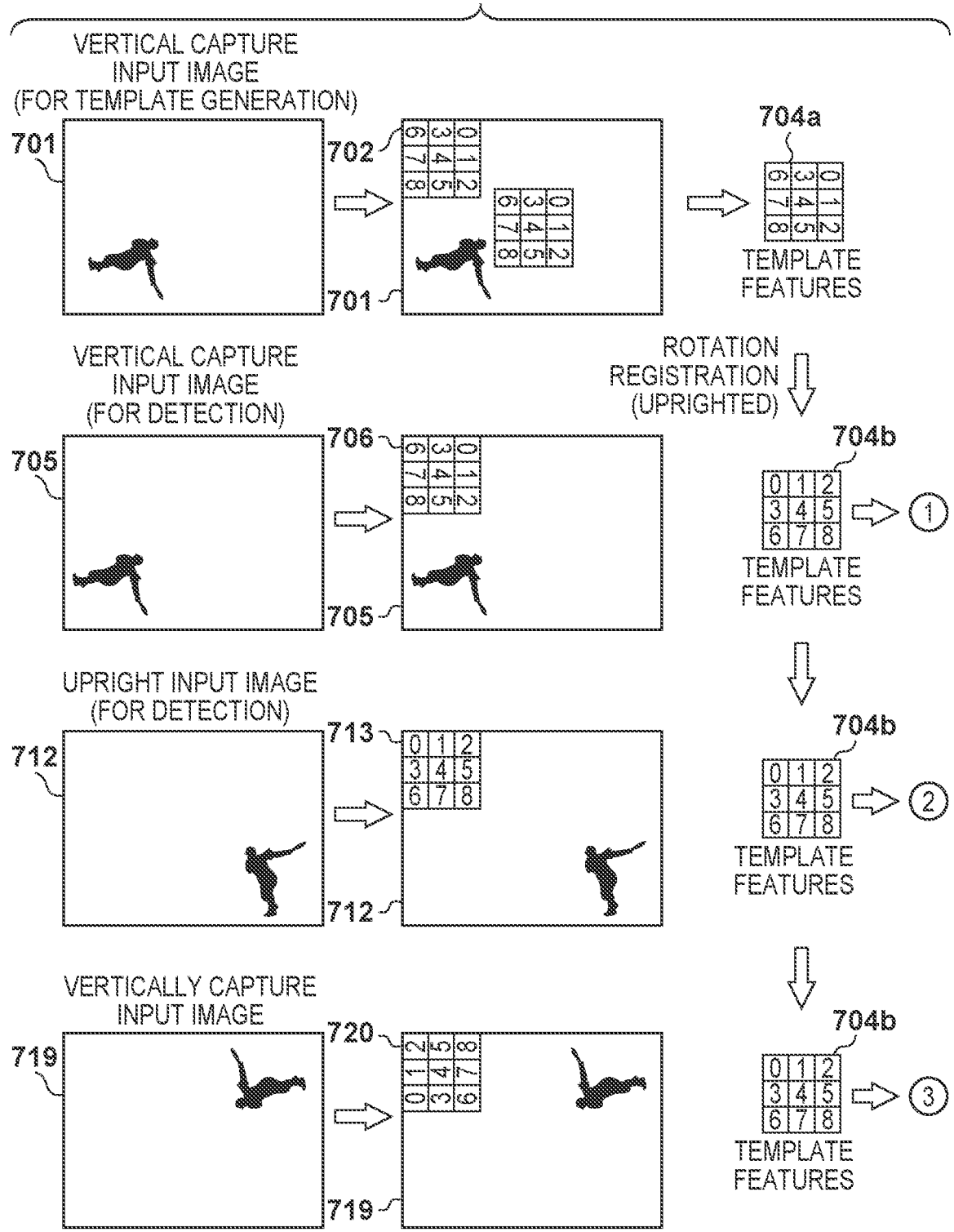
FIGS. 7A and 7B are views illustrating a template feature extraction and correlation calculation according to a first embodiment in a case where an image capturing orientation is changed.
Figure 7B:
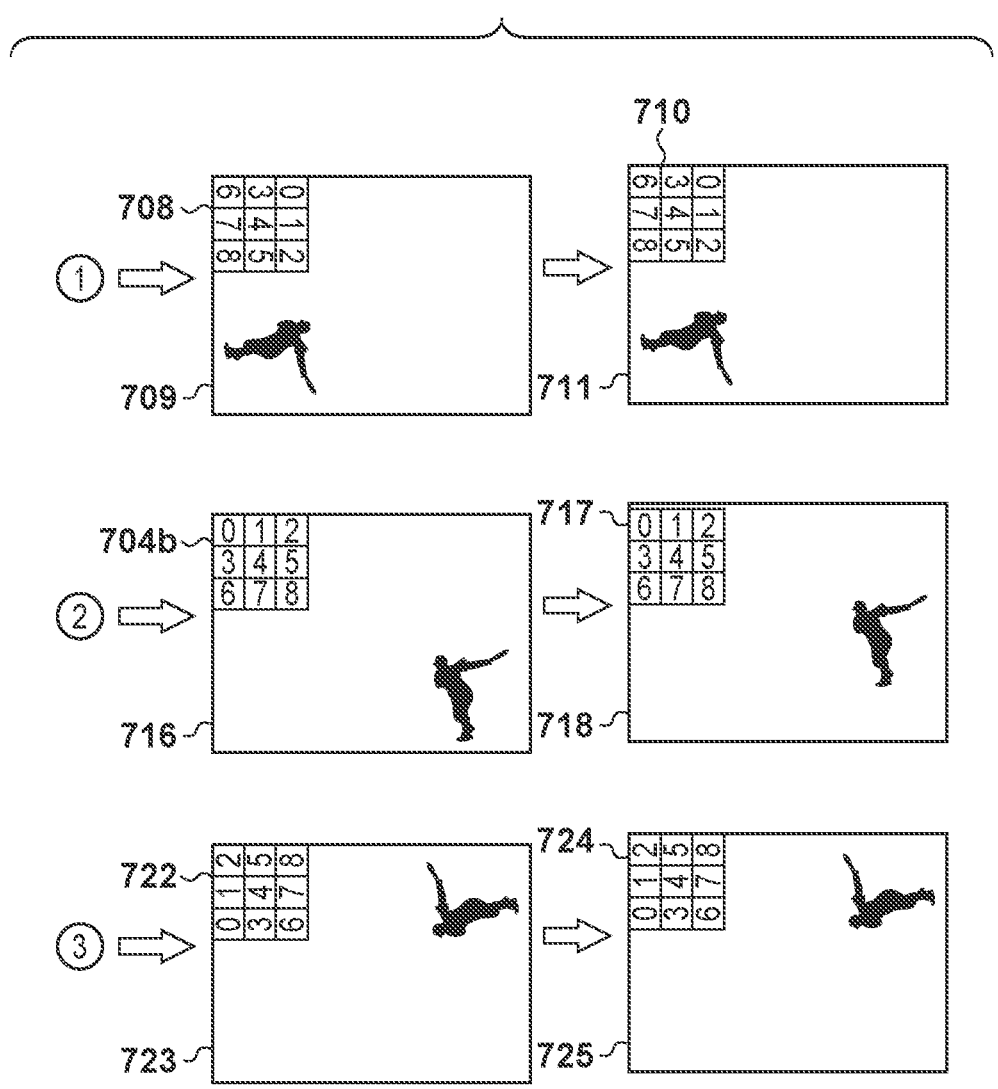

On the other hand, an extraction of a template feature and a correlation calculation of the present embodiment in the case where the image capturing orientation changes will be described with reference to FIGS. 7A and 7B. In a case where an input image 701 in which the target object is captured by vertical capturing, a coefficient pattern 702 is rotated 90 degrees clockwise instead of rotating the input image 701, and a feature map is generated by performing CNN processing in which the rotated coefficient pattern 702 and the input image 701 are used. Then, a CNN feature group in the region of the target object in the feature map is acquired as a template feature 704a. Also, the template feature 704a is rotated and registered in accordance with the image capturing orientation at the time of registration. Specifically, a template feature 704b acquired by rotating the template feature 704a 90 degrees counterclockwise (rotating by 90 degrees in a rotational direction opposite to the rotational direction of the coefficient pattern 702) is registered. In this case, as will be described below, the correlation calculation can be executed using the registered template 704b persistently regardless of the image capturing orientation at the time of the correlation calculation.

Assume that a new input image 705 in which the image capturing orientation is vertical capturing at the time of correlation calculation is acquired. Here, the coefficient pattern 706 is rotated 90 degrees clockwise, and a feature map 709 is acquired by performing CNN processing in which the rotated coefficient pattern 706 and the input image 705 are used. Then, a correlation map 711 is generated by performing a correlation calculation between the acquired feature map 709 and the template feature 708 which is acquired by rotating the previously registered template feature 704b 90 degrees clockwise. Then, the CNN processing is performed on the correlation map 711 (by using a coefficient pattern 710 rotated 90 degrees clockwise) to generate a detection map.

Next, assume that an input image 712 in which the image capturing orientation is an upright orientation at the time of correlation calculation is acquired. Here, a feature map 716 is acquired by performing CNN processing in which a non-rotated coefficient pattern 713 and the input image 712 are used. Then, a correlation calculation is performed between the acquired feature map 716 and the previously registered template feature 704b to generate a correlation map 718. Also, the CNN processing is performed on the correlation map 718 (by using non-rotated coefficient pattern 717) to generate a detection map.

Further, assume that an input image 719 in which the image capturing orientation at the time of correlation calculation is a vertical capturing in a direction opposite to that of the input image 701 is acquired. In this case, a feature map 723 is acquired by performing CNN processing in which a coefficient pattern 720 rotated 90 degrees counterclockwise and the input image 719 are used. Then, correlation calculation is performed between the acquired feature map 723 and the template feature 722 which is acquired by rotating the previously registered template feature 704b 90 degrees counterclockwise to generate a correlation map 725. Also, the CNN processing is performed on the correlation map 725 (by using a coefficient pattern 724 rotated 90 degrees counterclockwise) to generate a detection map.

As described above, by rotating and then registering the template feature according to the image capturing orientation at the time of registering the template feature, it is possible to calculate an appropriate correlation map regardless of the image capturing orientation by using a hardware coefficient rotation mechanism.

Next, the rotation of the coefficient pattern and the template feature performed by the rotation processing unit 107 will be described. The rotation processing performed by the rotation processing unit 107 is rotation processing of a two-dimensional array such as a coefficient pattern or a template feature, which is performed by changing the reading order of elements from the two-dimensional array.

Figure 3:
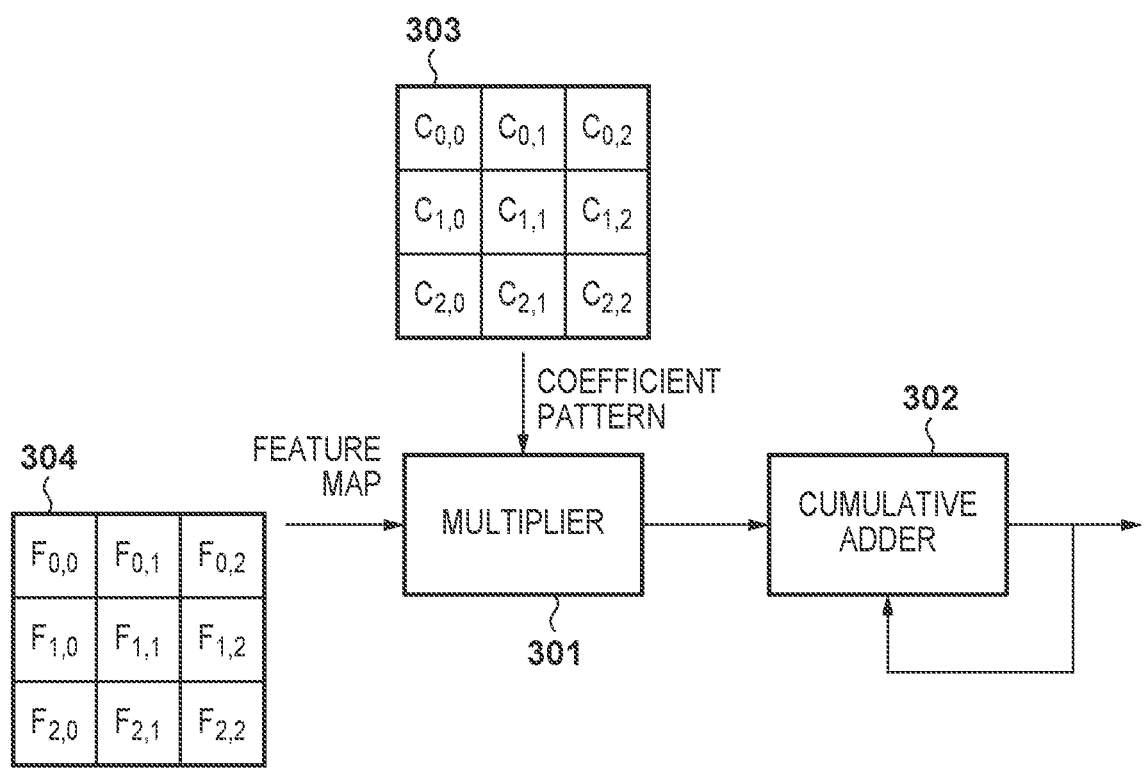
FIG. 3 is a block diagram illustrating an operation of a calculation processing unit 102.

As shown in FIG. 3, a 3×3 coefficient pattern acquired from the CPU 203 via the I/F unit 101 is stored in a buffer 303, and a 3×3 feature map read from the buffer 104 is stored in a buffer 304.

The buffer 303 for storing coefficient patterns has nine registers (C0,0, C0,1, C0,2, C1,0, C1,1, C1,2, C2,0, C2,1, C2,2). In each of the nine registers, a CNN coefficient at a corresponding position in the 3×3 coefficient pattern is stored. Specifically, the register C0,0 stores a CNN coefficient at the left end of the uppermost row in the coefficient pattern. C0,1 stores a CNN coefficient at the center of the uppermost row in the coefficient pattern. C0,2 stores a CNN coefficient at the right end of the uppermost row in the coefficient pattern. Further, the register C1,0 stores a CNN coefficient at the left end of the center row in the coefficient pattern. C1,1 stores a CNN coefficient at the center of the center row in the coefficient pattern. C1,2 stores a CNN coefficient at the right end of the center row in the coefficient pattern. Further, the register C2,0 stores a CNN coefficient at the left end of the bottommost row in the coefficient pattern. C2,1 stores a CNN coefficient at the center of the bottommost row in the coefficient pattern. C2,2 stores a CNN coefficient at the right end of the bottommost row in the coefficient pattern.

The buffer 304 for storing feature maps has nine registers (F0,0, F0,1, F0,2, F1,0, F1,1, F1,2, F2,0, F2,1, F2,2). In each of the nine registers, a CNN feature at a corresponding position in a 3×3 feature map is stored. Specifically, the register F0,0 stores a CNN feature at the left end of the uppermost row in the feature map. F0,1 stores a CNN feature at the center of the uppermost row in the feature map. F0,2 stores a CNN feature at the right end of the uppermost row in the feature map. Also, the register F1,0 stores a CNN feature at the left end of the center row in the feature map. F1,1 stores a CNN feature at the center of the center row in the feature map. F1,2 stores a CNN feature at the right end of the center row in the feature map. Also, the register F2,0 stores a CNN feature at the left end of the bottommost row in the feature map. F2,1 stores a CNN feature at the center of the bottommost row in the feature map. F2,2 stores a CNN feature at the right end of the bottommost row in the feature map.

The calculation processing unit 102 (a multiplier 301) performs, based on the coefficient pattern stored in the buffer 303, a product-sum calculation between a CNN coefficient data sequence outputted from the rotation processing unit 107 and the feature map stored in the buffer 304. Further, the calculation processing unit 102 (the cumulative adder 302) implements a convolution calculation according to the above-described equation by performing cumulative addition of the result of the product-sum calculation.

As will be described later, the rotation processing unit 107 reads each CNN coefficient of a coefficient pattern stored in the buffer 303 in an order determined according to the orientation information, and outputs a one-dimensional data sequence (a CNN coefficient data sequence) in which the read CNN coefficients are arranged in the read order. In other words, the n (1≤n≤9)-th CNN coefficient from the head of the CNN coefficient data sequence is the n-th CNN coefficient read from the coefficient pattern stored in the buffer 303.

The multiplier 301 refers to the nine registers in the buffer 304 in a raster data order (an order of F0,0, F0,1, F0,2, F1,0, F1,1, F1,2, F2,0, F2,1, F2,2), and reads CNN features registered in the referenced registers.

Then, the multiplier 301 acquires a multiplication result between the n-th CNN coefficient (1≤n≤9) and the n-th CNN feature read from the buffer 304 in the CNN coefficient data sequence, and cumulatively adds the acquired nine multiplication results, thereby completing one spatial filter calculation. In practice, a cumulative sum of the data corresponding to a plurality of coefficients and a plurality of feature surfaces is calculated in accordance with a CNN connection relationship. That is, a spatial filter calculation in relation to a plurality of feature surfaces of the previous layers is executed on the feature surfaces. Therefore, the number of spatial filters is the number of feature surfaces of the entire hierarchy multiplied by the number of feature surfaces to be processed.

A case where the coefficient pattern is rotated by the rotation processing unit 107 in such a case will be described. Note, as described above, since both the coefficient pattern and the template feature are two-dimensional arrays, the following description can be similarly applied to the rotation of the template feature.

Figure 8:
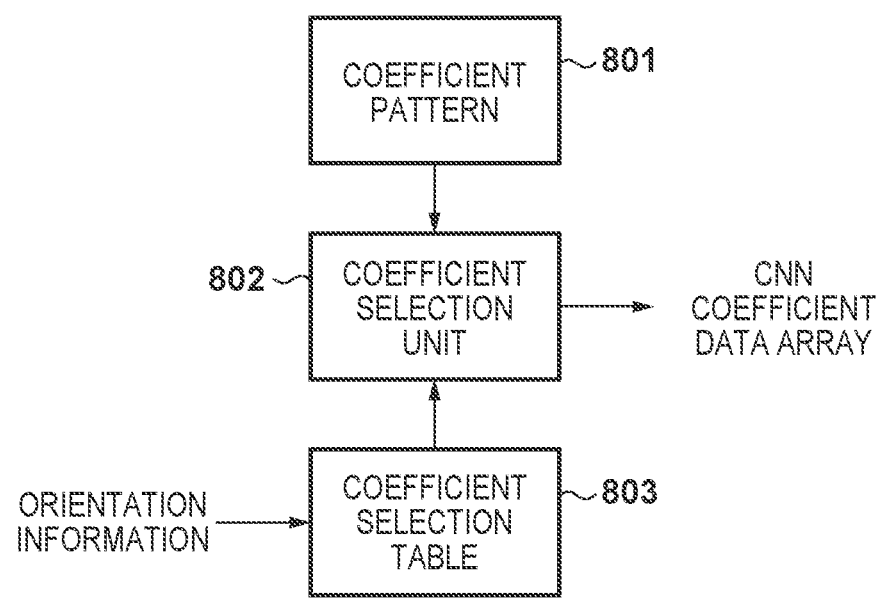
FIG. 8 is a block diagram illustrating a configuration example of a rotation processing unit 107.

A configuration example of the rotation processing unit 107 will be described with reference to a block diagram of FIG. 8. A coefficient selection unit 802 acquires the reading order registered in a coefficient selection table 803 in association with the orientation information acquired from the CPU 203 via the I/F unit 101. The coefficient selection table 803 stores, for example, four types of reading orders according to the image capturing orientation. For example, in a case where orientation information indicates "vertically held", the coefficient pattern 801 is rotated 90 degrees clockwise. Here, orientation information indicating "vertically held" and the reading order "C2,0, C1,0, C0,0, C2,1, C1,1, C0,1, C2,2, C1,2, C0,2" are registered in association with each other in the coefficient selection table 803.

Also, the coefficient selection unit 802 refers to the nine registers included in the buffer 303 in the acquired reading order. For example, in a case where orientation information indicates "vertically held", the coefficient pattern 801 is rotated 90 degrees clockwise. Here, the nine registers included in the buffer 303 are referred to in the order of "C2,0, C1,0, C0,0, C2,1, C1,1, C0,1, C2,2, C1,2, C0,2". Then, the coefficient selection unit 802 reads out the CNN coefficients stored in the registers in the referenced order, and outputs a one-dimensional data sequence (CNN coefficient data sequence) in which the read CNN coefficients are arranged in the order in which they are read. Note that the registers are referred to in the order of "C2,0, C1,0, C0,0, C2,1, C1,1, C0,1, C2,2, C1,2, C0,2", the CNN coefficients stored in the referenced registers are read, and a 3×3 pattern in which the read CNN coefficients are arranged in a raster data order in the read order is a coefficient pattern acquired by rotating the coefficient pattern 801 held by the buffer 303 90 degrees clockwise.

The coefficient selection table 803 outputs the CNN coefficient data sequence acquired in this way to the multiplier 301. Note that configuration may be taken such that the multiplier 301 performs generation of the CNN coefficient data sequence.

Note, in a case where the buffer 303 is configured by a register, the coefficient selection unit 802 can be configured by a selector that sequentially selects the outputs. As described above, the rotation processing unit 107 can be configured by using the coefficient selection table 803 having a relatively small amount of data and a selector for selecting a coefficient, and a rise in cost required for the rotation processing unit 107 is negligible. Also, in a case where a plurality of types of kernel sizes are supported, configuration may be taken such that the information stored in the coefficient selection table 803 and the configuration of the coefficient selection unit 802 are only changed according to the type of kernel.

Figure 9:
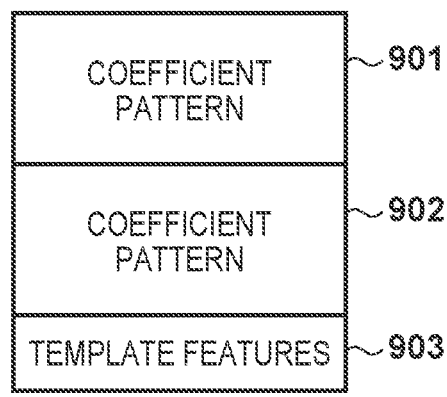
FIG. 9 is a diagram illustrating a configuration example of a memory region in a buffer 103.

Next, a configuration example of a memory region in the buffer 103 will be described with reference to FIG. 9. FIG. 9 shows a configuration example of a memory region of the buffer 103 in the example of FIGS. 4A and 4B, and the coefficient pattern 402/the coefficient pattern 407 are stored in a memory region 901 and the coefficient pattern 414 is stored in a memory region 902. Also, the template features 411 are stored in the memory region 903.

The coefficient patterns stored in the memory region 901 and the memory region 902 are transferred to the buffer 303 in prescribed units (3×3 in the example of FIG. 8) based on the control of the control unit 106. Also, the template feature stored in the memory region 903 is transferred to the buffer 303 in prescribed units (3×3 in the example of FIG. 8) based on the control of the control unit 106.

With such a configuration, it is possible to implement a rotation of a coefficient pattern or a template feature. For example, in a case where the template feature 704b acquired by rotating the template feature 704a in FIG. 7A is stored in the buffer 103, elements 6, 3, 0, 7, 4, 1, 8, 5, and 2 arranged in a raster data order in the template feature 704a are read in the order of elements 0, 1, 2, 3, 4, 5, 6, 7, and 8, the 3×3 template feature 704b in which the elements 0, 1, 2, 3, 4, 5, 6, 7, and 8 are arranged in the raster data order is formed, and then the template feature 704b is stored in the buffer 103. In a case where the correlation calculation is executed on consecutive images, processing corresponding to the image capturing orientation can be executed simply by a setting of the orientation information even in cases where there is a variation in the image capturing orientation.

As described above, according to the present embodiment, since a template feature is rotated and stored in an upright direction in accordance with an image capturing orientation at the time of generating the template feature, a correlation calculation can be efficiently executed in accordance with the image capturing orientation at the time of the correlation calculation. That is, during the correlation calculation, rotation of a captured image is not required regardless of the image capturing orientation, and a template feature can be processed using the rotation mechanism of the coefficient pattern. In other words, CNN processing and the correlation calculation can be processed in response to an orientation variation by shared hardware.

Thus, in a case where the image processing apparatus according to the present embodiment is applied to tracking processing of a target object, the target object can be smoothly tracked without any special processing even in cases where the image capturing orientation is changed (for example, in cases where image capturing is performed while changing the manner in which the image processing apparatus is held).

Note, in the present embodiment, the image processing apparatus has been described as having the image input unit 202, but limitation is not made to this, and configuration may be taken such that the image input unit 202 is an external apparatus. For example, configuration may be taken such that the image processing apparatus executes the various processes described above based on an input image received from the image input unit 202 externally via a wired or wireless network.

Similarly, although the image processing apparatus has been described as having the acquisition unit 210 for acquiring orientation information, limitation is not made to this, and configuration may be taken such that the acquisition unit 210 is an external apparatus. For example, configuration may be taken such that the image processing apparatus executes various processes described above by using orientation information received from the acquisition unit 210 externally via a wired or wireless network.

Also, in the present embodiment, the orientation sensor is used for measuring the image capturing orientation, but the method for acquiring the image capturing orientation is not limited to a specific method. For example, configuration may be taken such that the image capturing orientation is estimated from a plurality of captured images, the image capturing orientation is measured using other types of sensors, or the image capturing orientation is acquired by combining several methods. Also, configuration may be taken such that the user inputs orientation information by operating the user interface unit 208.

Further, in the present embodiment, a CNN is used for hierarchical spatial filter calculation, but the hierarchical spatial filter calculation is not limited to a specific method, and may be performed using, for example, other types of hierarchical neural networks.

Also, various processes described as being performed by the correlation calculation unit 201 may be executed by a processor such as the CPU203, a Graphics Processing Unit (GPU), a Digital Signal Processing Unit (DSP), or the like.

Second Embodiment

In the present embodiment, differences from the first embodiment will be described, and it is assumed that descriptions are similar to the first embodiment unless specifically touched upon otherwise. In the first embodiment, a feature map in each layer is stored in the buffer 104, but in this case, the capacity required for the buffer 104 increases. The increase in capacity is especially problematic in a case where the number of feature maps in each layer is large. Therefore, configuration may be taken such that processing is performed across a plurality of hierarchies for each small region rather than performing processing for each hierarchy. In this case, processing of each layer is performed in prescribed units (for example, a line-by-line basis). As a result, for example, consider that the feature maps 410 or the correlation maps 413, which are intermediate results of the hierarchical processing illustrated in FIGS. 4A and 4B, are stored. Then, (in the case of storing in the buffer 104), the memory region corresponding to (the number of lines required for the spatial filter calculation multiplied by the number of maps) can be allocated in the buffer 104 and processed. That is, the hierarchical network is processed by using the buffer 104 as a ring buffer on a line-by-line basis.

FIG. 11 is a view for schematically describing an example of a feature surface of a CNN in a case where processing is performed by using a line buffer. Reference numeral 1101 denotes a ring line buffer for the input image 406, reference numeral 1102 denotes a ring line buffer for the feature maps 410, and reference numeral 1103 denotes a ring line buffer for the correlation maps 413. Note, FIG. 11 shows an example in which the size of the spatial filter is 3×3. The memory for holding the detection map 417 of the final layer is configured by a frame buffer holding all results. For example, regarding the feature maps 410, a convolution calculation for one line is executed after the reference data on which filter processing is possible is stored in the line buffer 1101 of the input image 406. A feature map or a correlation map is calculated while the ring line buffers 1101 to 1103 are each circularized on a line-by-line basis. The calculation processing unit 102 processes the network across the hierarchy while switching the feature surface processed on a line-by-line basis.

The control for processing in the line buffer is controlled by the control unit 106, for example, which sequentially performs the convolution calculations 408, 412, and 415 for each line of the input image in step S1009. Such processing can be implemented, for example, by the configuration disclosed in Japanese Patent No. 5184824.

Note that at the time of a convolution calculation, the rotational direction of CNN coefficients is specified in the rotation processing unit 107 in accordance with orientation information. In the present embodiment, since a template feature is always registered in an upright state regardless of the image capturing orientation at the time of registration, the same rotation may be specified in all layers according to the image capturing orientation at the time of the correlation calculation. In other words, even in a case where the correlation calculation is processed across a plurality of layers, it is possible to efficiently perform processing without performing special processing between the layers in accordance with variations in the image capturing orientation.

Third Embodiment

In the first and second embodiments, rotation of a two-dimensional array is performed by changing the reading order of elements of the two-dimensional array, but the rotation of the two-dimensional array may be performed by other methods. For example, configuration may be taken such that the two-dimensional array is rotated by a rotation mechanism using hardware.

Further, configuration may be taken such that a two-dimensional array rotated at a plurality of angles is created in advance and held in the RAM 205, and one of the plurality of two-dimensional arrays created in advance is selected and used in accordance with the orientation information. For example, a two-dimensional array rotated 90 degrees clockwise, a two-dimensional array rotated 90 degrees counterclockwise, and a two-dimensional array rotated 180 degrees clockwise/counterclockwise are created in advance. Then, for example, in a case where the orientation information indicates vertical clockwise capturing, a two-dimensional array rotated by 90 degrees clockwise is selected, and in a case where the orientation information indicates vertical counterclockwise capturing, a two-dimensional array rotated 90 degrees counterclockwise is selected.

Further, in the first and second embodiments, a template feature is a map of CNN features extracted from a local region in a feature map, but limitation is not made to this, and any map of CNN features acquired based on the feature map may be used. For example, configuration may be taken such that the template feature is a map of processed CNN features extracted from some regions in the feature map.

Further, although description is given in the first and second embodiments assuming that, in the registration of a template feature, the template feature is converted into a template feature that is upright in accordance with the image capturing orientation and then registered, configuration may be taken such that the template feature is converted into a specific direction that is determined in advance and registered regardless of the image capturing orientation. However, in this case, for example, it is necessary to control the rotation of the template feature in the case of calculating the correlation maps 413 so as to be different from another convolution calculation.

Further, in the first and second embodiments, a case has been described in which an image at the time of acquisition of the template feature and an image targeted for correlation calculation are different, but the image at the time of acquisition of the template feature and the image targeted for the correlation calculation may be the same.

Also, the rotation processing unit 107, the calculation processing unit 102, the conversion processing unit 105, or one or more functional units included therein illustrated in FIG. 1 may be implemented by hardware or may be implemented by software. In the latter case, software is executed by the control unit 106 or the CPU 203, and thereby the functions of the corresponding functional units are implemented.

Further, the numerical values, processing timings, processing orders, the performers of processing, transmission destinations/transmission sources/storage locations of data (information), and the like used in each of the above-described embodiments are given as examples for the purpose of concrete description, and are not intended to be limited to such examples.

Also, some or all of the embodiments described above may be used in combination as appropriate. Also, some or all of the embodiments described above may be used selectively.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-066493, filed Apr. 13, 2022, which is hereby incorporated by reference herein in its entirety.

What is claimed is:

1. An image processing apparatus comprising:
a controller comprising one or more processors and/or one or more circuits, the controller being configured to function as a plurality of units comprising:
(1) a first generation unit configured to (a) set filter coefficients in a first coefficient array based on first orientation information indicating an image capturing orientation of a first captured image and (b) generate a first feature map by applying the filter coefficients set in the first coefficient array to the first captured image;
(2) a registration unit configured to (a) acquire, based on the first feature map, a template feature corresponding to a target object and (b) register the template feature in a first feature array based on the first orientation information;
(3) a second generation unit configured to (a) set filter coefficients in a second coefficient array based on second orientation information indicating an image capturing orientation of a second captured image and (b) generate a second feature map by applying the filter coefficients set in the second coefficient array to the second captured image;
(4) a calculation unit configured to (a) set the registered template feature in a second feature array based on the second orientation information and (b) perform a correlation calculation between the template feature set in the second feature array and the second feature map; and
(5) a detection unit configured to detect, based on a result of the correlation calculation, the target object from the second captured image,
wherein the first generation unit sets the filter coefficients in the first coefficient array by rotating the filter coefficients in accordance with the first orientation information, and
wherein the registration unit registers the acquired template feature in the first feature array by rotating the acquired template feature inversely to the rotation of the filter coefficients by the first generation unit.

2. The image processing apparatus according to claim 1, wherein the second generation unit sets the filter coefficients in the second coefficient array by rotating the filter coefficients in accordance with the second orientation information, and
wherein the calculation unit sets the registered template feature in the second feature array by rotating the registered template feature in accordance with the rotation of the filter coefficients by the second generation unit.

3. The image processing apparatus according to claim 1, wherein the registration unit acquires a feature within a region of the target object in the first feature map as a template feature.

4. The image processing apparatus according to claim 1, wherein the first generation unit generates the first feature map based on a convolution calculation between the filter coefficients that are set in the first coefficient array and the first captured image, and
wherein the second generation unit generates the second feature map based on a convolution calculation between the filter coefficients that are set in the second coefficient array and the second captured image.

5. The image processing apparatus according to claim 4, wherein the convolution calculation is executed by using a hierarchical neural network.

6. The image processing apparatus according to claim 5, wherein the convolution calculation is performed in prescribed units for each layer of the hierarchical neural network.

7. The image processing apparatus according to claim 1, wherein the calculation unit performs the correlation calculation by a convolution calculation between the second feature map and the template feature set in the second feature array.

8. The image processing apparatus according to claim 1, wherein the detection unit generates, based on the result of the correlation calculation, a detection map indicating a likelihood of a position of the target object in the second captured image.

9. The image processing apparatus according to claim 8, wherein the plurality of units further comprises a control unit configured to perform, in accordance with the detection map, control according to image capturing.

10. The image processing apparatus according to claim 9, wherein the control unit performs control in order to track and capture the target object.

11. The image processing apparatus according to claim 1, wherein the plurality of units further comprises a unit configured to acquire images captured as the first captured image and the second captured image.

12. The image processing apparatus according to claim 1, wherein the plurality of units further comprises a unit configured to acquire the first orientation information and the second orientation information.

13. An image processing method performed by an image processing apparatus, the method comprising:
setting filter coefficients in a first coefficient array based on first orientation information indicating an image capturing orientation of a first captured image;
generating a first feature map by applying the filter coefficients set in the first coefficient array to the first captured image;
acquiring, based on the first feature map, a template feature corresponding to a target object;
registering the template feature in a first feature array based on the first orientation information;
setting filter coefficients in a second coefficient array based on second orientation information indicating an image capturing orientation of a second captured image;
generating a second feature map by applying the filter coefficients set in the second coefficient array to the second captured image;
setting the registered template feature in a second feature array based on the second orientation information;
performing a correlation calculation between the template feature set in the second feature array and the second feature map; and
detecting, based on a result of the correlation calculation, the target object from the second captured image,
wherein the setting filter coefficients in the first coefficient array sets the filter coefficients in the first coefficient array by rotating the filter coefficients in accordance with the first orientation information, and
wherein the registering the template feature registers the acquired template feature in the first feature array by rotating the acquired template feature inversely to the rotation of the filter coefficients.

14. A non-transitory computer-readable storage medium that stores a computer program to cause a computer to function as a plurality of units, wherein the computer comprises one or more processors and/or one or more circuits, and the plurality of units comprises: (1) a first generation unit configured to (a) set filter coefficients in a first coefficient array based on first orientation information indicating an image capturing orientation of a first captured image and (b) generate a first feature map by applying the filter coefficients set in the first coefficient array to the first captured image; (2) a registration unit configured to (a) acquire, based on the first feature map, a template feature corresponding to a target object and (b) register the template feature in a first feature array based on the first orientation information; (3) a second generation unit configured to (a) set filter coefficients in a second coefficient array based on second orientation information indicating an image capturing orientation of a second captured image and (b) generate a second feature map by applying the filter coefficients set in the second coefficient array to the second captured image; (4) a calculation unit configured to (a) set the registered template feature in a second feature array based on the second orientation information and (b) perform a correlation calculation between the template feature set in the second feature array and the second feature map; and (5) a detection unit configured to detect, based on a result of the correlation calculation, the target object from the second captured image, wherein the first generation unit sets the filter coefficients in the first coefficient array by rotating the filter coefficients in accordance with the first orientation information, and wherein the registration unit registers the acquired template feature in the first feature array by rotating the acquired template feature inversely to the rotation of the filter coefficients by the first generation unit.

* * * * *